UNITED STATES PATENT OFFICE.

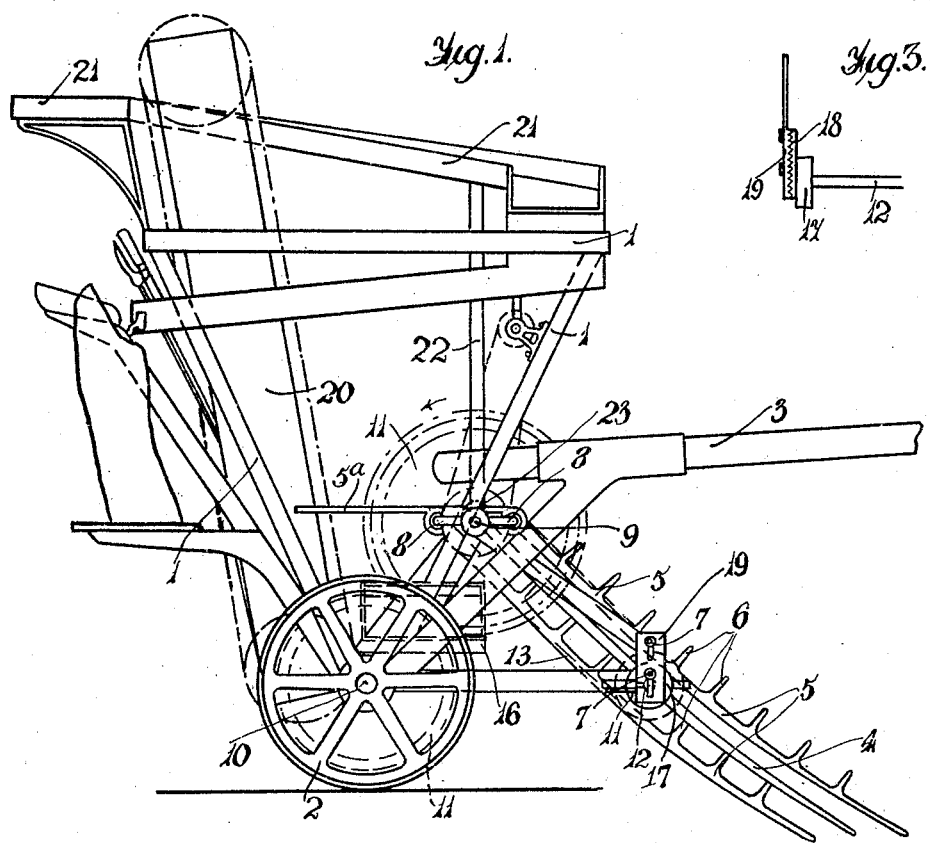

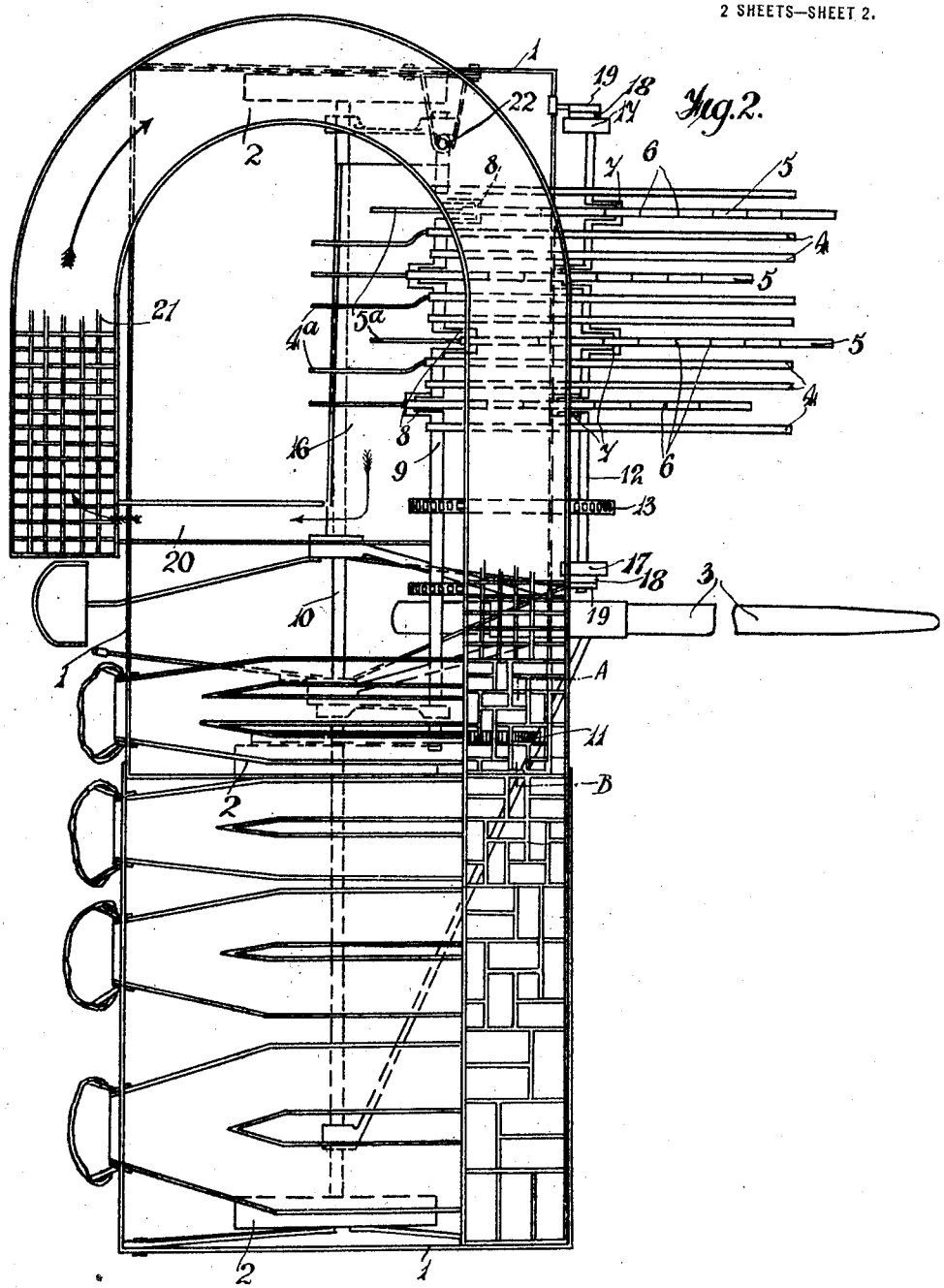

ROGER GITTINS, OF SHREWSBURY, ENGLAND.

POTATO-DIGGING MACHINE.

1,411,966.      Specification of Letters Patent.      Patented Apr. 4, 1922.

Application filed May 15, 1918. Serial No. 234,744.

*To all whom it may concern:*

Be it known that I, ROGER GITTINS, of 71 Abbey Foregate, Shrewsbury, in the county of Shropshire, England, have invented a new and useful Potato-Digging Machine; and I do hereby declare the following to be a full, clear, and exact description of the same.

My invention comprises improvements in machines for collecting potatoes and the like, from stones, applicable also for collecting potatoes from the ground.

The collecting mechanism of the machine comprises a series of curved or inclined prongs the extremities of which enter the ground as the machine travels along, means being provided for reciprocating some of the prongs so as to cause the potatoes, potato tops and weeds to travel up the fixed prongs.

In order that my invention may be clearly understood and more readily carried into practice I have appended hereunto two sheets of drawings illustrating the same, wherein:—

Figure 1 is a side elevation of a machine according to this invention.

Figure 2 is a plan of same.

Figure 3 is a detail view showing an adjustable bracket for carrying the lower crank shaft.

In carrying this invention into practice as illustrated upon the accompanying drawings, the machine is of the portable type comprising a frame 1 carried by three wheels 2 and provided with a shaft 3 whereby it may be drawn.

The collecting mechanism comprises a series of plain fixed prongs 4 and intermediate between each pair of the fixed prongs 4 is a reciprocating prong 5 which is provided with upstanding projecting arms 6. These reciprocating arms are each carried by a pair of cranks 7, 8 which are so arranged as to cause the prongs to have a rising rearward movement so as to carry the potatoes up the fixed prongs in a direction towards the main body of the machine and away from the direction in which the machine is travelling.

The cranks 8 are carried by a shaft 9 which is driven from the main axle 10 by gearing 11, 11 indicated by the dotted lines in Figure 1, the shaft 9 rotating in the opposite direction to the axle 10. The cranks 7 are carried by a shaft 12 which is driven from the shaft 9 by the endless chain gearing 13, these two shafts rotating in the same direction.

These prongs collect the potatoes off the ground and convey them upwardly so as to fall into a trough 16 after passing over the upper ends of the prongs. As will be seen in Figure 2, the reciprocating prongs have horizontal and rearward extensions $5^a$ and alternate fixed prongs have similar projections $4^a$, these projections $4^a$ and $5^a$ being disposed above the trough 16 and are a sufficient distance apart to allow all the potatoes to fall between them, whilst the potato tops are carried rearwardly, ultimately falling off the rear ends of the projections $4^a$, $5^a$ on to the ground.

Suitable means are provided for adjusting the height of the shaft 12 and thus the height of the lower ends of the prongs so as to vary the extent to which they may enter into the ground as required. As illustrated in Figure 3, the shaft 12 is supported in a bearing 17 which is provided with a serrated plate 18 adapted to engage with a similar serrated plate 19 fixed to the frame of the machine, the plate 18 being adapted to be raised relatively to the plate 19, thus varying the height of the bearing and shaft. From the trough 16 the potatoes, and with them any stones which may have been picked up, are conveyed by the elevator 20 to the screen, which is generally indicated at 21. Mechanism is provided for shaking or jigging the screen, which, as illustrated, comprises a vertical member 22 which is adapted to be reciprocated by the cam 23.

I claim:—

In a machine of the specified kind, a plurality of inclined prongs with extremities adapted to enter the ground during the travel of the machine, certain of said prongs being fixed and others being arranged for reciprocating movement, and means for actuating the reciprocating prongs whereby they are caused to dig into the ground, and means whereby the potatoes, potato tops and weeds are caused to travel up the non-reciprocatory prongs.

In testimony whereof I affix my signature.

ROGER GITTINS.